US005202902A

United States Patent [19]

Isard et al.

[11] Patent Number: 5,202,902

[45] Date of Patent: Apr. 13, 1993

[54] CARRIER RECOVERY METHOD FOR MODULATION HAVING A LARGE NUMBER OF STATES, AND APPARATUS FOR IMPLEMENTING THE METHOD

[75] Inventors: Marc Isard, St. Germain En Laye; Christophe Mostkowy, Paris, both of France

[73] Assignee: Alcatel Transmission Par Faisceaux Hertziens, Levallois Perret Cedex, France

[21] Appl. No.: 688,396

[22] Filed: Apr. 22, 1991

[30] Foreign Application Priority Data

Apr. 27, 1990 [FR] France ............................... 90 05410

[51] Int. Cl.[5] ............................................ H04L 27/06

[52] U.S. Cl. ........................................ 375/97; 375/78

[58] Field of Search ....................... 375/39, 78, 81, 83, 375/97, 120; 329/307

[56] References Cited

U.S. PATENT DOCUMENTS

| | | | |
|---|---|---|---|
| 4,835,790 | 5/1989 | Yoshida et al. | 455/226 |
| 4,847,872 | 7/1989 | Hespelt et al. | 375/97 |
| 5,042,052 | 8/1991 | Roberts et al. | 375/97 |

*Primary Examiner*—Stephen Chin

*Attorney, Agent, or Firm*—Sughrue, Mion, Zinn, Macpeak & Seas

[57] ABSTRACT

A method of recovering the carrier for modulation having a large number of states, the method being wherein the demodulated constellation is brought to the monotonic range of a conventional estimator, with sufficient accuracy to enable autonomous operation on this new criterion. The invention also provides apparatus for implementing the method. The invention is particularly applicable to digital ratio beam transmission.

5 Claims, 3 Drawing Sheets

CARRIER RECOVERY METHOD FOR MODULATION HAVING A LARGE NUMBER OF STATES, AND APPARATUS FOR IMPLEMENTING THE METHOD

The invention relates to a carrier recovery method for modulation having a large number of states, and to apparatus for implementing the method.

BACKGROUND OF THE INVENTION

In the field of digital radio beams, modems are using modulation of ever increasing density. Only coherent demodulation is then possible since differential demodulation would give rise to too great a threshold displacement when using modulation having a very large number of states. Such coherent demodulation is based on the reliability and the quality of the carrier phase estimator as generated at the reception end.

Beyond 4-state phase modulation (4-PSK type) sampled estimators are used. They rely on samples of the demodulated signals being available, which samples are taken at the symbol rate and at the instant of maximum opening in the eye diagram. These samples come from analog-to-digital converters and they enable the transmitted symbols to be estimated and also the associated distortion to be evaluated.

For technological reasons, the conversion-estimation grid has been solved up to now by being reduced to useful information bits defining the symbol plus one or two extra bits giving the distortion.

The article by A. Leclert and P. Vandamme entitled "Universal carrier recovery loop for QASK and PSK signal sets" (Globecom '82 Conf. Rec., Vol. 3, pp. 1228–1232, Nov. 29–Dec. 2, 1982, Miami, FL) describes a carrier loop applicable to quadrature amplitude shift keying (QASK) and to phase shift keying (PSK). This article presents several QASK-16 estimation and conversion systems.

Such regeneration and estimation structures are now conventional and simplified gradient algorithms have been constructed for them based on knowing the sign of the received signal and the sign of the corresponding distortion. This family of estimators directs control of the regenerator (carrier, sync., amplitude) and of the time equalizer. The carrier estimator relies on calculating the effect of the in-phase X channel on the quadrature Y channel ($sgnX.sgn_{err}Y$) and the effect of the Y channel on the X channel ($sgnY.sgn_{err}X$).

However such a conventional estimator suffers from the drawback of seeing its monotonic range reduced to the range for which the distortion estimate is valid. This means that the criterion is valid only if the demodulated constellation has meaningful correspondence with the estimation grid. This condition restricts the possibilities of achieving phase locking to low levels of noise and of distortion.

An object of the present invention is to solve this problem by proposing a robust carrier recovery criterion applicable to modulation using a large number of states and capable of accommodating high levels of noise or of distortion.

SUMMARY OF THE INVENTION

To this end, the present invention provides a carrier recovery method for modulation having a large number of states, wherein the demodulated constellation is brought into the monotonic range of a conventional estimator, with sufficient accuracy to enable autonomous operation on this new criterion. Switching to the conventional estimator is preferable for minimizing demodulation jitter, but is not essential with a narrow loop bandwidth for which the new criterion turns out to be satisfactory.

More precisely, in the method of the invention the center of gravity of the received constellation in each quadrant of the regeneration plane is calculated.

Advantageously, the method of the invention makes it possible to avoid depending on the distortion estimate of each symbol, since such an estimate is too easily degraded by noise or by linear or non-linear distortion, thereby becoming dangerously fragile for modulation using a large number of states. The method of the invention therefore does not apply to the decision grid, but proposes a criterion based on the geometrical properties of the constellation to be demodulated. The concept of this type of estimator fits in well with the recent introduction of high resolution (8 bit) analog-to-digital converters in regenerators for performing digital filtering.

BRIEF DESCRIPTION OF THE DRAWINGS

An embodiment of the invention is described by way of example with reference to the accompanying drawings, in which.

DETAILED DESCRIPTION

Figure 1:
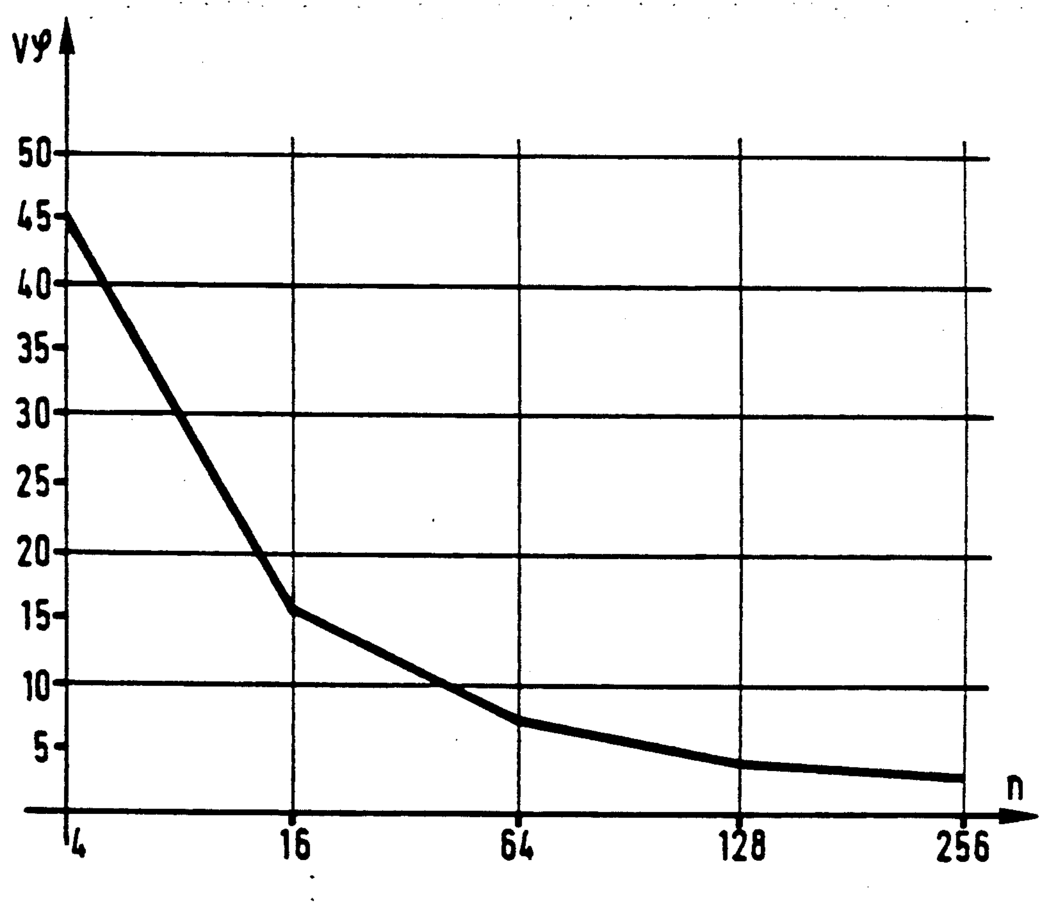
FIG. 1 shows the validity of a prior art phase estimator for phase rotation of the constellation.

FIG. 1 is a graph showing phase validity V as a function of the number n of modulation states.

From this curve, it can be seen that when the number of modulation states increases, the phase validity range of the estimator decreases: thus, beyond 64-QAM (64 state quadrature amplitude modulation) the validity range of the phase criterion falls below 10°.

$2^n$ state modulation, which comprises both amplitude modulation and phase modulation, may be described by representing signals as coordinates in two dimensions. The states may be disposed so that they are uniformly distributed relative to axes corresponding to two orthogonal carriers X and Y. A constellation is thus obtained which corresponds to a vector representation of carrier states whose projections on the X and Y axes give the end coordinates of the vector shown.

In the method of the invention, the center of gravity is calculated of the constellation as received in each quadrant of the regeneration XY plane. The equilibrium position of this center of gravity thus lies on the middle axes when carrier lock has been achieved. The position of the center of gravity provides information directly on the rotation of the constellation relative to the locking position.

This method reduces estimating the phase of complex modulation to the case of modulation having four phase states. It enables similar performance to be obtained during acquisition.

Figure 2:
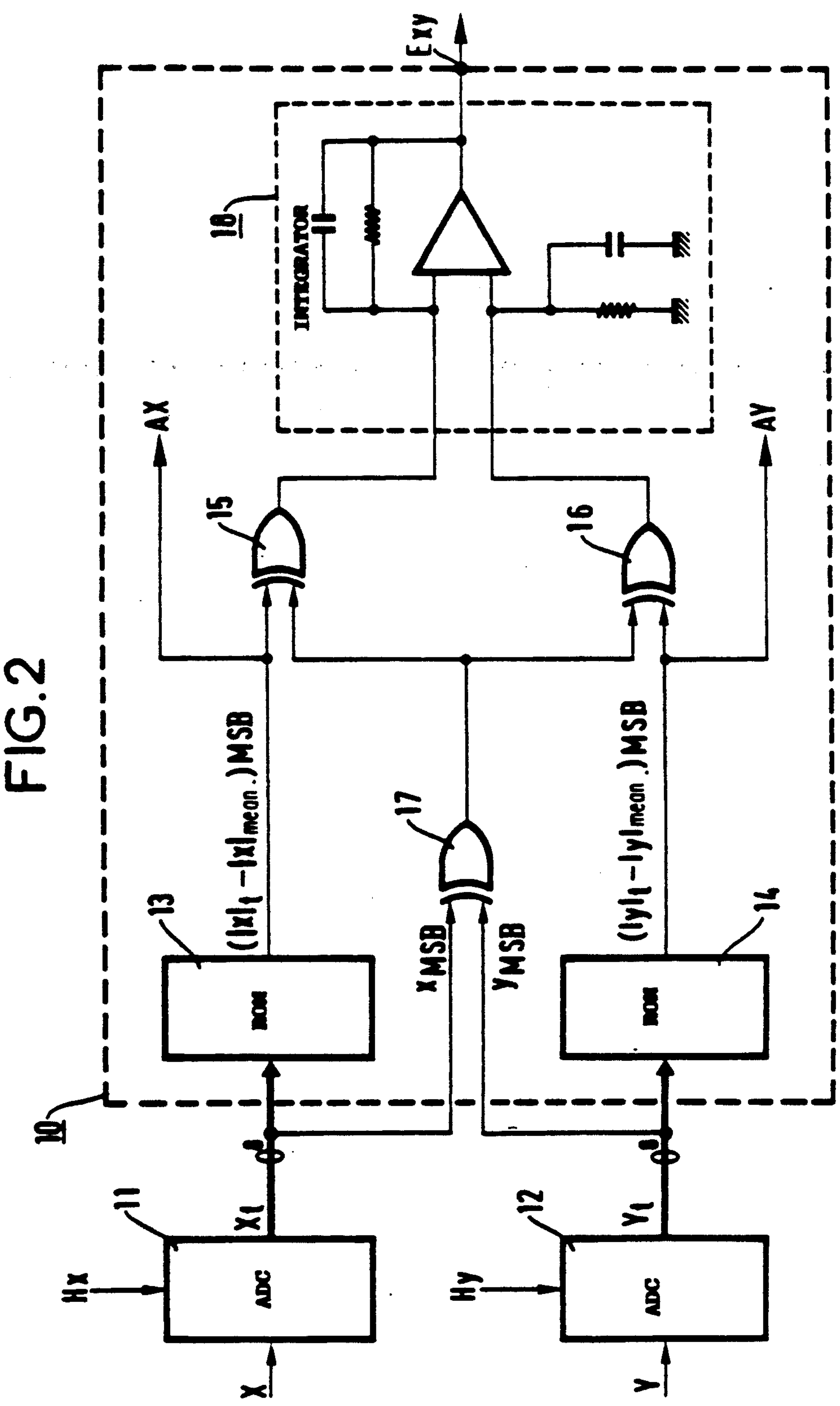
FIG. 2 is a circuit diagram of apparatus for implementing the method of the invention.

The apparatus 10 for implementing the method and as shown in FIG. 2 comprises, at the output from the two analog-to-digital converters 11 and 12 of the regenerator:

two calculation circuits 13 and 14 (e.g. memories) for discovering the difference between the center of gravity as obtained and the expected center of gravity, which circuits deliver signals $sgn(|x|t-|x|mean)$ and $sgn(|y|t-|y|mean)$ which are used respectively for servo-controlling the amplitudes of channels X and Y, i.e. AX and AY as shown in FIG. 2;

three exclusive-OR logic gates 15, 16, and 17 receiving the sign bits (i.e. the most significant bits "MSB") enabling the following two signals to be obtained $(x_{MSB} \oplus y_{MSB}) \oplus (|x|t-|x|mean)_{MSB}$ and $(x_{MSB} \oplus y_{MSB}) \oplus (|y|t-|y|mean)_{MSB}$ corresponding to the following terms of equation 1 as given further on:

$$sgn[x(t)].sgn[y(t)].[sgn|x|(t)-|x|mean]$$

and $$sgn[x(t)].sgn[y(t)].[sgn|y|(t)-|y|mean];$$

and and an integrator circuit 18 for obtaining the difference between these two signals, which difference is then used for recovering the carrier.

Recovering the rates Hx and Hy makes it possible to find the symbol rate by detecting zero crossings, and the instant at which the eye diagram is open at its widest, i.e. the optimum sampling instant. Samples of the in-phase signal channel X and of the quadrature channel Y are obtained at the outputs from the analog-to-digital converters of the regenerator. Their position relative to the centers of gravity $|x|mean$ and $|y|mean$ can then be determined. $|x|(t)-|x|mean$ and $|y|(t)-|y|mean$ are calculated in two read only memories (ROM) for example. The two estimators created in this way serve to govern the amplitude servo-control associated with each channel. This apparatus thus provides automatic gain control on each of the channels X and Y, thereby ensuring that the estimate of the center of gravity offset is valid. For the first quadrant, $Ex=sgn(|x|(t)-|x|mean)$ and $Ey=sgn(|y|(t)-|y|mean)$ respectively define the signs of the displacements of the center of gravity of the constellation relative to equilibrium. The difference Ex-Ey provides the phase estimator for the first quadrant. The interpretation of phase rotation is valid only in those portions of the plane where $(|x|-|x|mean).(|y|-|y|mean)<0$, since in other regions the estimator cancels. Generalization to all four quadrants is performed by applying an operator that folds regeneration space onto the first quadrant: i.e. by multiplying the expression Ex-Ey by $sgn[x(t)].sgn[y(t)]$. The estimator provided in this way can be written:

$$Exy=sgn[x(t)].sgn[y(t)].[sgn|x|(t)-|x|mean)-sgn(|y|(t)-|y|mean)]$$

(this is the above-mentioned Equation 1)

Figure 3:
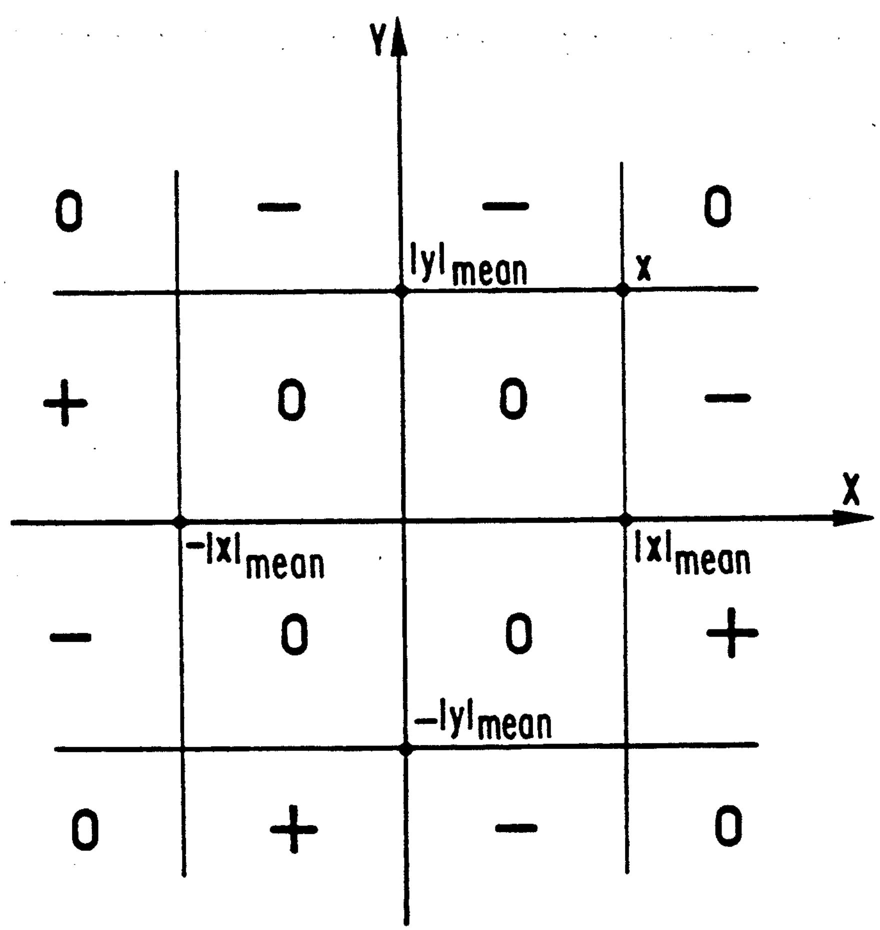
FIG. 3 shows the sign of the phase estimator in the regeneration plane.

FIG. 3 shows the value of this estimator in regeneration XY space.

By using the method of the invention, a QAM-256 constellation remains properly locked even when suffering from a high level of noise since the noise level is compared with the weight of the center of gravity of the constellation in a quadrant. The estimator thus makes it possible to use signal-to-noise ratios which are as low as are used in 4-phase modulation.

Naturally the present invention has been described and shown merely by way of preferred example and its component parts could be replaced by equivalent parts without thereby going beyond the scope of the invention.

We claim:

1. A method of recovering the carrier from a received signal, said received signal having a large number of modulation states represented by a received constellation having quadrants in a regeneration plane, said method comprising the steps of:

calculating a center of gravity of the received constellation in each quadrant of the regeneration plane in order to bring the demodulated constellation within the monotonic range of a conventional estimator, with sufficient accuracy to enable autonomous operation on this new criterion; and generating a phase estimate in accordance with the calculated center of gravity.

2. A method according to claim 1, further comprising the step of applying an operator which folds the regeneration plane onto a first of said quadrants, thereby generalizing the method to all four quadrants.

3. An apparatus for recovering the carrier from a received signal, said received signal having a large number of modulation states represented by a received constellation having quadrants in a regeneration plane, said apparatus including:

first means for calculating a center of gravity of the received constellation in each quadrant of the regeneration plane in order to bring the demodulated constellation within the monotonic range of a conventional estimator, with sufficient accuracy to enable autonomous operation on this new criterion; and second means for generating a phase estimate in accordance with the calculated center of gravity, said second means comprising:

two circuits for calculating the difference between the calculated center of gravity and an expected center of gravity of the received constellation in each quadrant, respectively for an X channel and for a Y channel corresponding to two orthogonal carriers; and a circuit for calculating the phase estimate for the four quadrants.

4. An apparatus according to claim 3, wherein the two circuits for calculating the difference between the calculated center of gravity and the expected center of gravity are two read only memories.

5. Apparatus according to claim 3, wherein the circuit for calculating the phase estimate comprises a circuit giving the phase estimator for the first quadrant and three exclusive-OR logic gates for applying an operator that folds the regeneration plane onto the first quadrant, thereby generalizing to all four quadrants.

* * * * *